United States Patent
Fukase et al.

(10) Patent No.: US 6,221,253 B1
(45) Date of Patent: Apr. 24, 2001

(54) SEDIMENTATION ACCELERATION AGENT FOR ACTIVATED SLUDGE AND METHOD FOR USING THE SAME

(75) Inventors: Tetsuro Fukase; Hidenari Yasui, both of Kanagawa (JP)

(73) Assignee: Kurita Water Industries Ltd. (JP)

( * ) Notice: Subject to any disclaimer, the term of this patent is extended or adjusted under 35 U.S.C. 154(b) by 0 days.

(21) Appl. No.: 09/041,336

(22) Filed: Mar. 12, 1998

(30) Foreign Application Priority Data

Mar. 14, 1997 (JP) ................................................ 9-061108

(51) Int. Cl.⁷ ........................... C02F 3/00; B01D 35/06
(52) U.S. Cl. ......................... 210/695; 210/626; 210/805
(58) Field of Search .................................. 210/695, 805, 210/626

(56) References Cited

U.S. PATENT DOCUMENTS

| | | |
|---|---|---|
| 4,148,731 * | 4/1979 | Brigante ............................... 210/223 |
| 4,152,210 | 5/1979 | Robinson et al. . |
| 4,735,725 | 4/1988 | Reischl et al. . |
| 5,000,853 | 3/1991 | Reischl et al. . |

FOREIGN PATENT DOCUMENTS

| | | |
|---|---|---|
| 57-078990 | 5/1982 | (JP) . |
| 57-135085 | 8/1982 | (JP) . |
| 57-135091 | 8/1982 | (JP) . |
| 61-129095 | 6/1986 | (JP) . |
| 7-080491 | 3/1995 | (JP) . |
| 8-052487 | 7/1996 | (JP) . |
| 8-168790 | 7/1996 | (JP) . |

* cited by examiner

Primary Examiner—David A. Reifsnyder
(74) Attorney, Agent, or Firm—Morrison Law Firm

(57) ABSTRACT

A powder of magnetized material is added to an aeration chamber, and aeration is conducted. The mixture is then sent to a sedimentation chamber, and solid-liquid separation is conducted. A portion of the precipitated sludge is returned to the aeration chamber as return sludge and reused. Sedimented sludge is highly concentrated, due to the action of the magnetized material. By returning a portion to the aeration chamber as return sludge, the biomass concentration becomes high, and high load operation in the aeration chamber can be achieved.

11 Claims, 3 Drawing Sheets

SEDIMENTATION ACCELERATION AGENT FOR ACTIVATED SLUDGE AND METHOD FOR USING THE SAME

BACKGROUND OF THE INVENTION

The present invention relates to a sedimentation acceleration agent for activated sludge. More particularly, the present invention relates to an activated sludge sedimentation accelerating agent which can concentrate sedimented sludge in a sedimentation chamber of an activated sludge processing system. The present invention also relates to a method for processing waste water containing activated sludge which uses the sedimentation accelerating agent of the present invention.

Waste water, such as sewage, has been conventionally purified using an activated sludge processing system. The main components of the activated sludge processing system are an aeration chamber and a sedimentation chamber. In this system, waste water is first brought to an aeration chamber where activated sludge is stored. Activated sludge is an aggregate of various microorganisms. The waste water is aerated and mixed with the activated sludge. Organic matter in the waste water is biologically oxidized and broken down. A portion of this oxidized organic matter is converted to activated sludge (microorganism biomass), and another portion of the oxidized organic matter is broken down to carbon dioxide gas and water. The activated sludge forms flocculate clumps ("flocs"), and floats in the mixed liquor.

Next, the mixed liquor in the aeration chamber is transported to the sedimentation chamber. Natural sedimentation of activated sludge by the action of gravity occurs, producing a solid-liquid separation of the above mixed liquor into a supernatant and sedimented sludge. A portion of the sedimented sludge is returned to the aeration chamber as return sludge and is recycled in order to maintain the concentration of activated sludge in the aeration chamber at a set value.

The main drawback of the conventional activated sludge processing system described above is that organic matter in the waste water is not efficiently converted to activated sludge in the aeration chamber. Furthermore, solid-liquid separation of the mixed liquor into sedimented sludge and supernatant in the sedimentation chamber occurs slowly. As a result, the concentration of sedimented sludge is low.

Furthermore, if the sedimented sludge is at a low concentration, the amount that must be returned to the aeration chamber to maintain the concentration of activated sludge in the aeration chamber at a set value becomes large. This results in a shortened aeration time used for purifying the water, and leads to inadequate processing. Therefore, to maximize the operating efficiency of the aeration chamber, the sedimented sludge must be highly concentrated. In other words, the suspended solid (SS) concentration in the mixed liquor (ML) which is to be returned to the aeration chamber (hereinafter "the MLSS") must be increased.

The difference in specific gravity between activated sludge and water is small. Therefore, natural sedimentation of activated sludge in the sedimentation chamber occurs slowly. At times, bulking occurs, and sedimentation no longer occurs. In addition, even in the absence of bulking, the sedimented sludge obtained by natural sedimentation is not highly concentrated.

Furthermore, if organic matter or the like is localized in the waste water, clumped flocs are not generated. Instead, filamentous bulking masses are formed during the aeration step. The sludge is no longer sedimented in the sedimentation chamber. When this occurs, not only is return sludge not generated, but sludge may overflow from the sedimentation chamber.

Several solutions to these problems have been proposed. In Japanese Examined Patent Number 63-59759, an iron or nickel metal powder is added to the aeration chamber. The iron or nickel metal powder is stirred and retained in the activated sludge. By having the activated sludge then attach magnetically to a rotating magnet, the activated sludge and processed water are forced to separate. The activated sludge which is magnetically attached to the rotating body is removed, and is used as the return sludge. A similar method is disclosed in Japanese Laid-Open Patent Number 8-168790.

In Japanese Examined Patent Number 5-10997, sludge sedimentation accelerating agents which have a specific gravity greater than 1 and which coprecipitate with the activated sludge are added to the activated sludge suspension liquor, and the activated sludge and processed water are thereby separated. Examples of such sludge sedimentation accelerating agents include glass powder, alumina powder, and powderized iron oxide.

OBJECTS AND SUMMARY OF THE INVENTION

It is an object of the present invention to overcome the limitations of the prior art.

It is another object of the present invention to provide a method for accelerating the sedimentation of activated sludge in a waste water processing system.

It is another object of the present invention to provide an agent for accelerating the sedimentation of sludge in a waste water processing system.

Briefly stated, a powder of magnetized material is added to an aeration chamber, and aeration is conducted. The mixture is then sent to a sedimentation chamber, and solid-liquid separation is conducted. A portion of the precipitated sludge is returned to the aeration chamber as return sludge and reused. Sedimented sludge is highly concentrated, due to the action of the magnetized material. By returning a portion to the aeration chamber as return sludge, the biomass concentration becomes high, and high load operation in the aeration chamber can be achieved.

According to an embodiment of the present invention, a method for accelerating sludge sedimentation in an activated sludge processing system comprises the steps of adding particles of magnetized powder to an aeration chamber containing a mixed liquor, the mixed liquor containing activated sludge and waste water, mixing the particles of magnetized powder with the mixed liquor to form a mixture, transferring the mixture to a sedimentation chamber, sedimenting the activated sludge in the sedimentation chamber to form a sedimented sludge, separating the sedimented sludge from the mixed liquor, and returning a portion of the sedimented sludge to the aeration chamber as return sludge.

According to another embodiment of the present invention, a mixture comprises particles of magnetized powder and activated sludge in an activated sludge processing system.

According to another embodiment of the present invention, a method for accelerating sludge sedimentation in an activated sludge processing system comprises the steps of withdrawing at least one of a portion of a return sludge and a portion of a mixed liquor from at least one of an aeration chamber and a sedimentation chamber to a mixing chamber, the mixed liquor containing activated sludge and waste water, adding particles of magnetized powder to the mixing chamber, mixing the particles of magnetized powder with the at least one of a portion of a return sludge and a portion of a mixed liquor to form a mixture, adding the mixture to the aeration chamber containing the mixed liquor, transferring the mixed liquor in the aeration chamber to the sedimentation chamber, sedimenting the activated sludge in the sedimentation chamber to form a sedimented sludge, separating the sedimented sludge from the mixed liquor, and returning a portion of the sedimented sludge to the aeration chamber as the return sludge.

According to another embodiment of the present invention, a method for accelerating sludge sedimentation in an activated sludge processing system, comprises the steps of withdrawing at least one of a portion of a return sludge and a portion of a mixed liquor from at least one of an aeration chamber and a sedimentation chamber to a mixing chamber, the mixed liquor containing activated sludge and waste water, adding particles of magnetized powder and particles of non-magnetized powder to the mixing chamber, mixing the particles of magnetized powder and the particles of non-magnetized powder with the at least one of a portion of a return sludge and a portion of a mixed liquor to form a mixture, adding the mixture to the aeration chamber containing the mixed liquor, transferring the mixed liquor in the aeration chamber to the sedimentation chamber, sedimenting the activated sludge in the sedimentation chamber to form a sedimented sludge, separating the sedimented sludge from the mixed liquor, and returning a portion of the sedimented sludge to the aeration chamber as the return sludge.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
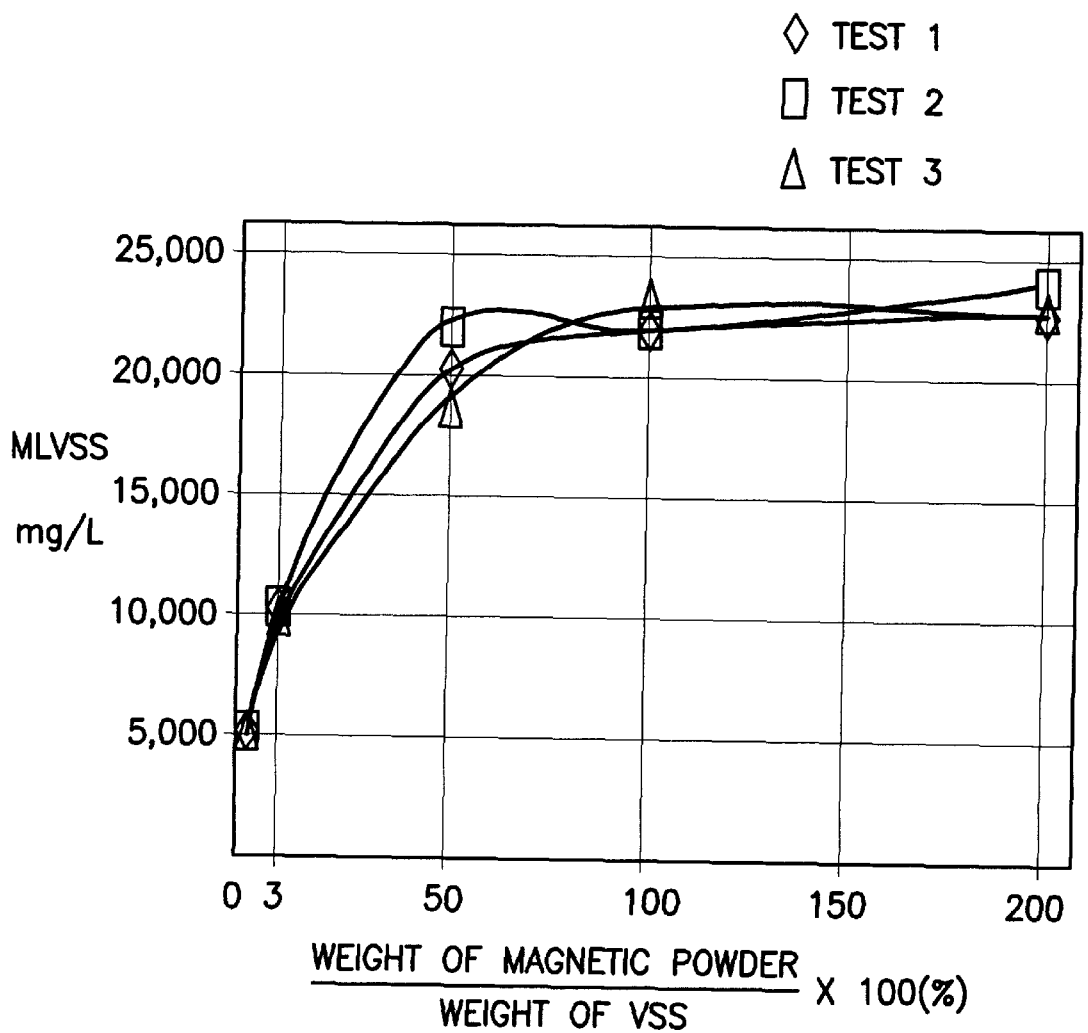
FIG. 1 is a graph showing the relationship between the amount of magnetized powder added with respect to the VSS of the aeration chamber and the upper limit of the MLVSS concentration.

In the present invention, a magnetized powder is added to an aeration chamber, and aeration is conducted. Each of the magnetized powder particles individually functions as a minute magnet. The mixture is then sent to a sedimentation chamber, where solid-liquid separation is conducted. A portion of the precipitated sludge is returned to the aeration chamber as return sludge and reused. Sedimented sludge is highly concentrated, due to the action of the magnetized powder. By returning a portion to the aeration chamber as return sludge, the volatile suspended solid concentration (VSS) of the mixed liquor (ML) in the aeration chamber (hereinafter "the MLVSS"), or in other words the biomass concentration, becomes high, and high load operation in the aeration chamber can be achieved.

To produce the magnetized powder of the present invention, blocks of material capable of forming permanent magnets (magnetic material) are first crushed into a powder. Thereafter, powder of the desired particle size is magnetized to the desired magnetic strength. Examples of magnetic material useful in the present invention include, for example, iron oxide, nickel oxide, and ferrite. One or more types of magnetic material may be used in the magnetized powder. The particle size of the powder is not limited, but should be of a size that may be retained in the activated sludge flocs in the aeration chamber. For this purpose, an average particle size of between 0.5 and 5.0 $\mu$m is preferred.

The amount of the activated sludge sedimentation accelerating agent added should be within an effective range. If the amount added to the aeration chamber is too small, the activated sludge sedimentation accelerating agent is not evenly distributed throughout the flocs of activated sludge present in the aeration chamber. As a result, in the sedimentation chamber, activated sludge where the magnetized powder is not distributed is not effectively sedimented. However, if the amount of activated sludge sedimentation accelerating agent which is added to the aeration chamber is too large, sedimented sludge is generated in the aeration chamber, and the operation of the aeration chamber must be halted. This effect may be offset to a certain degree by increased aeration and more vigorous stirring, but these adaptations may introduce undesirable effects. Furthermore, as the MLVSS concentration in the aeration chamber reaches saturation, further addition of the activated sludge sedimentation accelerating agent is wasteful. Therefore, the amount of the magnetized powder that constitutes the activated sludge sedimentation accelerating agent to be added is preferably the equivalent of 50–100% of the VSS in the aeration chamber.

The sludge sedimentation accelerating agent of the present invention preferably contains non-magnetized powder of magnetic material in addition to the magnetized powder. In this case, the strength of magnetization of the magnetized powder is diluted in the mixture powder. Even if the aeration conditions or the stirring conditions at the time of addition of the accelerating agent to the aeration chamber are weak, the accelerating agent is still evenly distributed throughout the activated sludge flocs. As a result, the operation conditions in the aeration chamber can optimized.

The ratio of magnetized powder to non-magnetized powder is preferably 5–95% by weight of the former and 95–5% by weight of the latter. If the ratio of magnetized powder is less than 5% by weight, the MLVSS concentration in the aeration chamber cannot be increased significantly.

Furthermore, during operation of the activated sludge processing system, return sludge and/or mixed liquor may be removed from the sedimentation chamber and/or the aeration chamber, preferably to a mixing chamber. Magnetized powder, non-magnetized powder, or a mixture of magnetized powder and non-magnetized powder may be added to the return sludge and mixed. Magnetized powder or a mixture of magnetized powder and non-magnetized powder may be added to the mixed liquor and mixed. Thereafter, the return sludge and/or mixed liquor is returned to the aeration chamber. In this manner, the amount of magnetized powder in the aeration chamber may be adjusted as desired.

EMBODIMENT 1

Magnetized powder of iron oxide (average particle size 0.7 $\mu$m) was prepared. The amount of magnetized powder added with respect to the VSS concentration was varied between 0% and 200% by weight. BOD load in the aeration chamber was set at 1 kg/m$^3$/day. The water surface area load of the sedimentation chamber was set at 15 m$^3$/m$^2$ day. An activated sludge processing system which returns sedimented sludge to the aeration chamber was operated. The MLVSS concentration upper limit where operation of the aeration chamber is still possible was determined for each amount of added magnetized powder. This upper limit of the MLVSS concentration was determined by altering the MLVSS concentration and operating the aeration chamber. At a certain MLVSS concentration, the sludge rose to the receiving well of the sedimentation chamber, and this concentration was taken as the MLVSS concentration upper limit. The above operation test was conducted three times. The results are shown in FIG. 1.

Referring to FIG. 1, it is clear that as the amount of iron oxide magnetized powder was altered, the upper limit of the MLVSS concentration in the aeration chamber changed. When the amount of magnetized powder was 0–3% by weight of VSS, the MLVSS concentration upper limit in the aeration chamber was around 10,000 mg/L. When the amount of magnetized powder was 10–50% by weight of VSS, the upper limit for MLVSS concentration in the aeration chamber increased with increasing amount of magnetized powder. When the amount of magnetized powder was 50% by weight or greater of the VSS, the upper limit for MLVSS concentration in the aeration chamber became greater than 20,000 mg/L.

When the amount of magnetized powder with respect to VSS reached 200% by weight, operation was stopped because sedimented sludge at the bottom of the aeration chamber was observed. Therefore, if too much magnetized powder is added, the activated sludge is readily sedimented. Accordingly, the preferred amount of magnetized powder to be added is set at 50–100% by weight of VSS.

COMPARATIVE EXAMPLE 1

Instead of magnetized powder, non-magnetized powder (average particle size 0.7 μm) comprising iron oxide was used. The remainder of the experiment was performed in the same manner as in Embodiment 1. The results are shown in FIG. 2.

Figure 2:
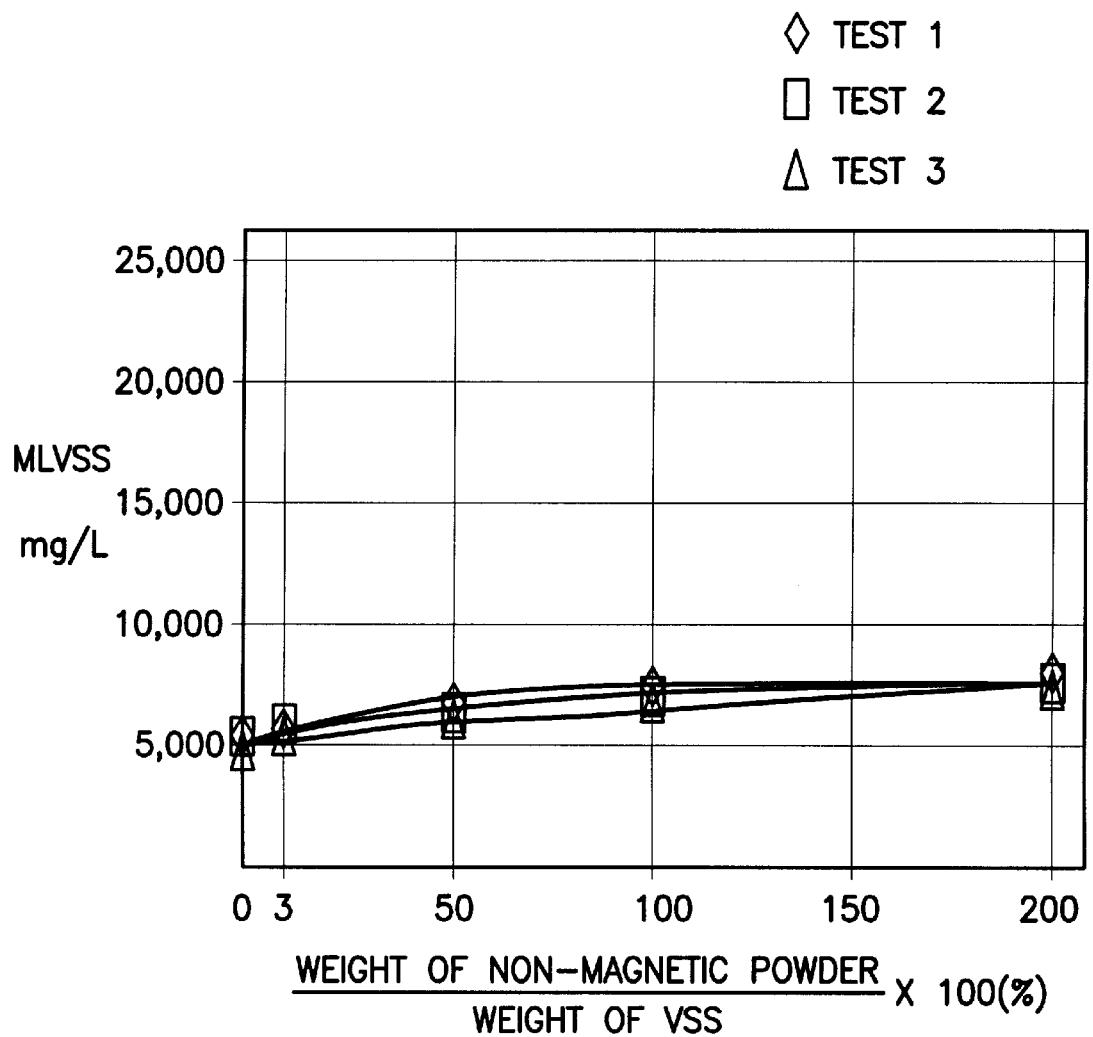
FIG. 2 is a graph showing the relationship between the amount of non-magnetized powder added with respect to the VSS of the aeration chamber and the upper limit of the MLVSS concentration.

Referring to FIG. 2, it is clear that when non-magnetized powder was added, the upper limit of the MLVSS concentration inside the aeration chamber was not significantly different from when no non-magnetized powder was added. The upper limit only reached a value of around 8,000 mg/L. Therefore, in order to have an increased MLVSS concentration inside the aeration chamber and in order to conduct high load operation, the addition of magnetized powder is necessary.

EMBODIMENT 2

Mixture powders of magnetized powder used in Embodiment 1 and non-magnetized powder used in Comparative Example 1 were prepared. Twelve different combinations of mixtures were prepared, with the mixture ratio of magnetized powder to non-magnetized powder being 0 (non-magnetized powder only), 1, 2, 3, 5, 7, 10, 20, 40, 60, 80, and 100 (magnetized powder only).

These mixture powders were added to the aeration chamber at an amount equivalent to 50% by weight of the VSS inside the aeration chamber. The system was operated as in Embodiment 1. The upper limit of the MLVSS concentration inside the aeration chamber was obtained. As in Embodiment 1, the operation test was conducted three times. The results are shown in FIG. 3.

Figure 3:
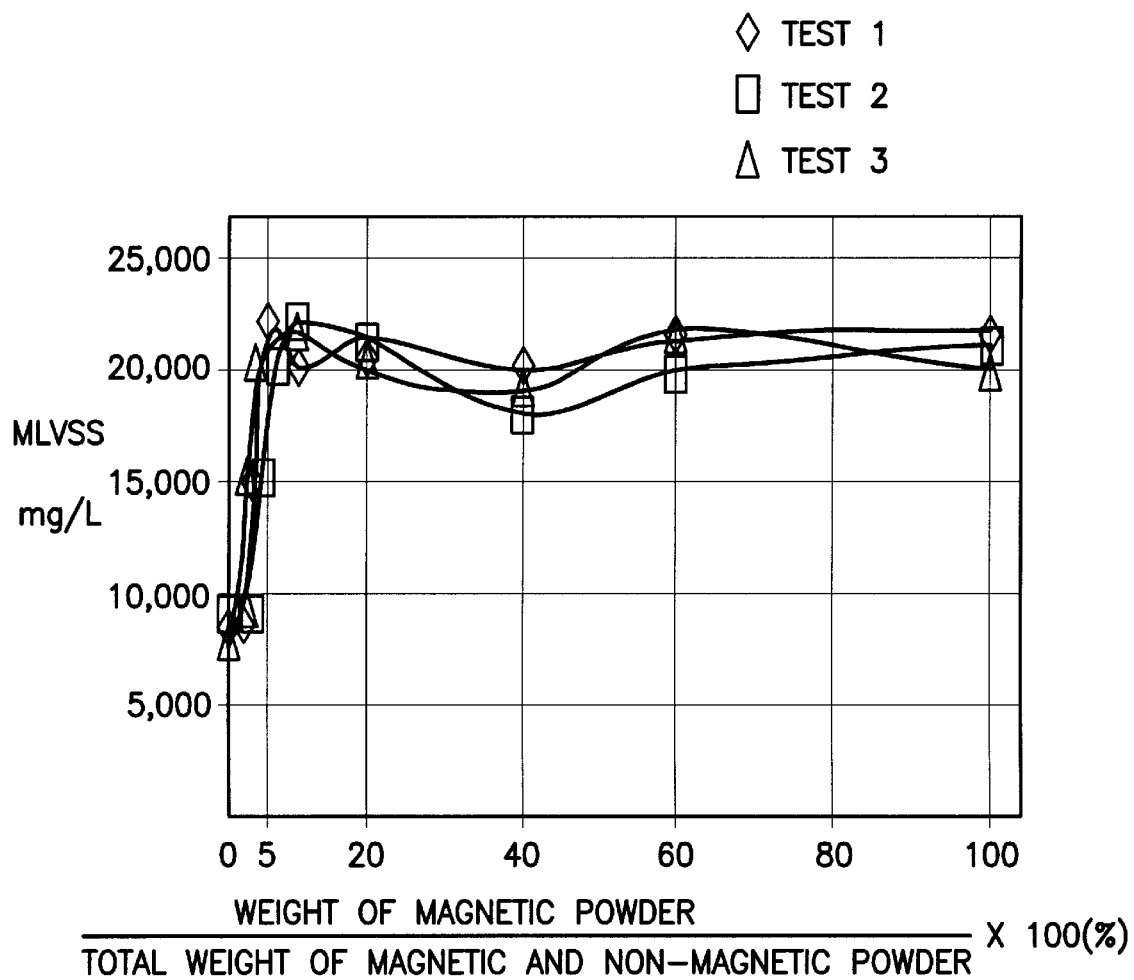
FIG. 3 is a graph showing the relationship between the magnetized powder:non-magnetized powder mixture ratio and the upper limit of the MLVSS concentration.

Referring to FIG. 3, it is clear that when the ratio of magnetized powder to non-magnetized powder in the mixture powder is less than 3, the upper limit of MLVSS concentration inside the aeration chamber is about the same as when no magnetized powder is added, and the effect of adding magnetized powder is not seen. When the ratio of magnetized powder in the mixture powder to non-magnetized powder becomes 5, the upper limit of the MLVSS concentration inside the aeration chamber reaches a high value of 20,000 mg/L. Therefore, when using a mixture powder of magnetized powder and non-magnetized powder, the mixing ratio of the magnetized powder should be 5% by weight or greater to increase the MLVSS concentration inside the aeration chamber and to achieve high load operation of the aeration chamber.

As is clear from the above, when using the activated sludge sedimentation accelerating agent of the present invention, the sedimentability of the activated sludge in the sedimentation chamber is increased. The obtained sedimented sludge can be highly concentrated. As a result, when a portion of the sedimented sludge is returned to the aeration chamber, continuous operation of the aeration chamber while maintaining a high MLVSS concentration is possible.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for accelerating sludge sedimentation comprising the steps of;

permanently magnetizing particles of magnetic powder to form particles of permanently magnetized powder;

adding said particles of permanently magnetized powder to an aeration chamber containing a mixed liquor;

said mixed liquor having a volatile suspended solids concentration;

said particles of permanently magnetized powder being at least 3% by weight with respect to the volatile suspended concentration of the mixed liquor in the aeration chamber;

said mixed liquor including activated sludge and waste water;

mixing said particles of permanently magnetized powder with said mixed liquor to form a mixture;

transferring said mixture to a sedimentation chamber;

sedimenting said activated sludge in said sedimentation chamber to form a sedimented sludge;

separating said sedimented sludge from said mixed liquor; and returning a portion of said sedimented sludge to said sedimented sludge to said aeration chamber as a return sludge.

2. A method for accelerating sludge sedimentation according to claim 1, wherein:

said particles of metallic powder are made from a magnetic metal selected to be at least one member from the group consisting of iron oxide, nickel oxide, and ferrite.

3. A method for accelerating sludge sedimentation according to claim 1, wherein said step of adding particles includes selecting said particles of permanently magnetized powder to have an average particle size between 0.5 and 5.0 μm.

4. A method for accelerating sludge sedimentation according to claim 1, wherein said particles of permanently magnetized powder are present at an amount that is between 50 and 100% of a weight of a volatile suspended solid in said aeration chamber.

5. A method for accelerating sludge sedimentation according to claim 1, further comprising adding particles of non-magnetized powder to said aeration chamber containing said mixed liquor.

6. A method for accelerating sludge sedimentation according to claim 5, wherein a weight ratio of said permanently magnetized powder to said non-magnetized powder is between 5:95 and 95:5.

7. A method for accelerating sludge sedimentation according to claim 5, wherein said step of adding particles includes selecting said particles of permanently magnetized powder to have an average particle size between 0.5 and 5.0 $\mu$m.

8. A method for accelerating sludge sedimentation according to claim 5, wherein said particles of permanently magnetized powder are present at an amount that is between 50 and 100% of a weight of a volatile suspended solid in said aeration chamber.

9. A method for accelerating sludge sedimentation according to claim 5, further comprising:

further selecting said particles of magnetized powder to have an average particle size between 0.5 and 5.0 $\mu$m; and maintaining a weight ratio of said magnetized powder to said non-magnetized powder between 5:95 and 95:5.

10. A method for accelerating sludge sedimentation in an activated sludge processing system, comprising the steps of:

withdrawing at least one of a portion of a return sludge and a portion of a mixed liquor from at least one of an aeration chamber and a sedimentation chamber to a mixing chamber;

said mixed liquor containing activated sludge and waste water;

adding particles of permanently magnetized powder to said mixing chamber;

mixing said particles of permanently magnetized powder with said at least one of a portion of a return sludge and a portion of a mixed liquor to form a mixture;

adding said mixture to said aeration chamber containing said mixed liquor;

transferring said mixed liquor in said aeration chamber to said sedimentation chamber;

sedimenting said activated sludge in said sedimentation chamber to form a sedimented sludge;

separating said sedimented sludge from said mixed liquor; and returning a portion of said sedimented sludge to said aeration chamber as said return sludge.

11. A method for accelerating sludge sedimentation in an activated sludge processing system, comprising the steps of:

withdrawing at least one of a portion of a return sludge and a portion of a mixed liquor from at least one of an aeration chamber and a sedimentation chamber to a mixing chamber;

said mixed liquor containing activated sludge and waste water;

adding particles of magnetized powder and particles of non-magnetized powder to said mixing chamber;

mixing said particles of permanently magnetized powder and said particles of non-magnetized powder with said at least one of a portion of a return sludge and a portion of a mixed liquor to form a mixture;

adding said mixture to said aeration chamber containing said mixed liquor;

transferring said mixed liquor in said aeration chamber to said sedimentation chamber;

sedimenting said activated sludge in said sedimentation chamber to form a sedimented sludge;

separating said sedimented sludge from said mixed liquor; and returning a portion of said sedimented sludge to said aeration chamber as said return sludge.

* * * * *